No. 12,215. REISSUED APR 26, 1904

H. E. SHARPS.

AUTOMATICALLY OPERATED MUSICAL INSTRUMENT

APPLICATION FILED JAN. 29, 1904.

Witnesses:-

Louis M. Y. Whitehead

Fred. G. Fischer.

Inventor:-

Herbert E. Sharps by Burton & Burton his Attys.

No. 12,215. Reissued April 26, 1904.

UNITED STATES PATENT OFFICE.

HERBERT E. SHARPS, OF CHICAGO, ILLINOIS, ASSIGNOR, BY MESNE ASSIGNMENTS, TO THE CABLE COMPANY, OF CHICAGO, ILLINOIS, A CORPORATION OF ILLINOIS.

AUTOMATICALLY-OPERATED MUSICAL INSTRUMENT.

SPECIFICATION forming part of Reissued Letters Patent No. 12,215, dated April 26, 1904.

Original No. 696,762, dated April 1, 1902. Application for reissue filed January 29, 1904. Serial No. 191,225.

*To all whom it may concern:*

Be it known that I, HERBERT E. SHARPS, a citizen of the United States, residing at Chicago, in the county of Cook and State of Illinois, have invented certain new and useful Improvements in Automatically-Operated Musical Instruments; and I do hereby declare the following to be a full, clear, and exact description of the invention, such as will enable others skilled in the art to which it appertains to make and use the same.

My invention relates to certain new and useful improvements in automatically-operated musical instruments, but more particularly refers to the primary valves for automatic pianos or organs.

The object of my invention is to afford means for delicately adjusting the relief-ports which lead into the exhaust-chamber, so that the equilibrium may be restored between said chamber and the air-supply ducts when the imperforate portion of the perforated music-sheet closes said air-ducts, whereby the primary pneumatic and primary valve may be allowed to drop in order to close communication between the exhaust-chamber and the pneumatic-chamber. In other words, the object of my invention is to provide novel means for equalizing the pressure on opposite sides of the primary pneumatic at predetermined times by exhausting the air to an equal degree on both sides thereof.

A further object of the present invention is the provision of means for governing the amount of atmosphere admitted into contact with the primary pneumatic, consisting in a duct communicating directly from the air-supply duct to the exhaust-chamber and means for controlling the effective caliber of said communicating duct; and a further specific object of the invention is to so locate the ducts in question that the means for controlling the caliber of said communicating ducts may be located in position conveniently accessible for adjustment at the side of the pneumatic action at which are located the ducts leading to the mouths which are controlled by the perforated music-sheet.

Figure 1:
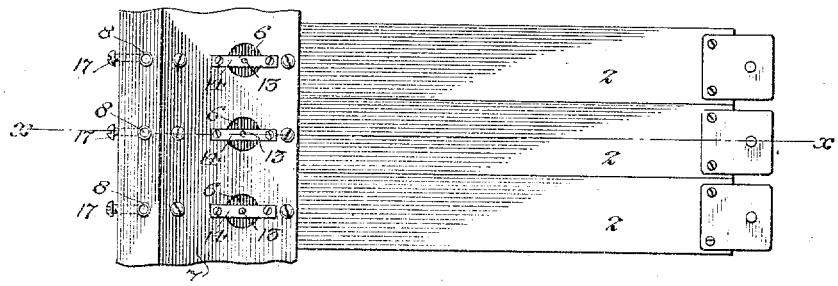
Figure 2:
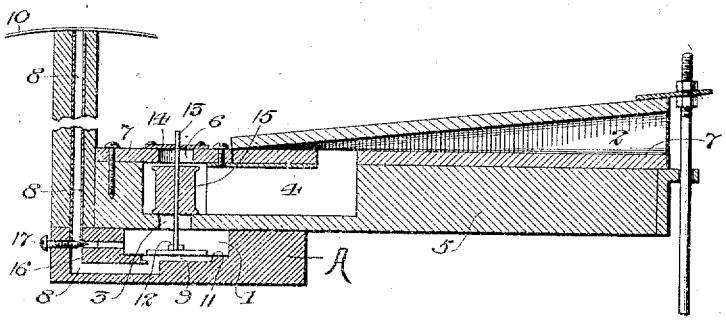

In the accompanying drawings, which form a part of this application, Figure 1 is a detail broken plan of a series of three of the mechanisms shown at Fig. 2, while Fig. 2 is a section at the line *x x* of Fig. 1.

Similar numbers of reference denote like parts in both figures of the drawings.

1 is the exhaust-chamber of the instrument, and 2 represents the pneumatic-chambers which control the devices for producing the sound and which communicate with the exhaust-chamber by means of the passage 3 and the auxiliary chamber 4 in the body 5, upon which latter the pneumatic-chambers are mounted.

6 is a passage cut through the roof 7 of the auxiliary chamber 4, which roof is a continuation of the floor of the pneumatic-chambers, which passage establishes a communication between said chamber and the outside air.

Leading from the bottom of the exhaust-chamber are ducts 8, whose inner mouths are widened, as shown at 9, and across whose outer mouths passes the paper 10, having cut therein the sound-controlling characters.

Secured across the mouths 9, so as to completely close the latter, are flexible diaphragms, one of which is shown at 11, while secured upon these diaphragms are disks, one of which is shown at 12, said diaphragms and disks constituting the primary pneumatics. Secured to these several disks are vertically-disposed valve-stems, one of which is shown at at 13, the upper extremities of said stems being supported and guided within suitable plates 14, secured across the passage 6.

15 is one of the primary valves, which is secured to the stem 13, and when the diaphragms are extended and restored to normal position these primary valves will operate in the usual manner. Preferably and for one of the specific purposes of my invention the exhaust-chamber 1 is formed, as shown, in a board or block A, which has an edge exposed at the side of the action at which the ducts lead off finally to the tracker-board, and in said board A the duct 8 extends vertically at a short distance back from said edge for continuation toward the mouths which are controlled by the paper 10.

The various instrumentalities and parts above described are as to their construction and operation well known in automatically-operated musical instruments that have heretofore been constructed, and I will now call attention to certain defects in this construction and also to the means which I employ to overcome these defects.

In the operation of the parts constructed as above described the exhausting of the air from the chamber 1 will cause the diaphragms 11 to swell upwardly, owing to the atmospheric pressure beneath them through the ducts 8, which ducts are constantly being opened to the outside air by their registration with the sound-producing characters cut in the paper which moves across the mouths of these ducts. The primary valves cannot drop, so as to close communication between the exhaust-chamber and the air-chamber 4, until these diaphragms are restored to their normal or horizontal position.

In my present improvement I provide comparatively small exhaust-ducts 16, which establish communication between the exhaust-chamber and the various ducts 8, leading from the vertically-extending portion of said duct 8, where it is located near the surface of the board A, directly into the exhaust-chamber 1, and through the outer wall, which incloses these ducts 8, I drive small screws 17, which extend across these ducts 8, the inner ends of these screws projecting within the exhaust-ducts 16, whereby the effective caliber of said ducts 16 may be regulated, and inasmuch as said ducts 16 communicate directly with the air-supply ducts 8 the amount of atmosphere admitted below diaphragms 11 may be regulated. By adjusting these screws so that their inner ends are very close to the mouths of the ducts 16 a very small amount of air will pass into the exhaust-chamber from the ducts 8, and by withdrawing these screws still farther from these ducts 16 the amount of air which will pass into the exhaust-chamber will be increased, and thus it will be seen that the exhaustion of air to the exhaust-chamber may be regulated with the greatest nicety. The location of the duct 8 and the passage 16 as described with respect to the vertical surface of the board A brings the screws 17 in position, exposing their heads in a horizontal row, where they are all easily accessible for adjustment as may be required in the original assembling and adjustment of the instrument or by reason of changes in the conditions arising in use. I do not limit myself to the exposure of said screws by horizontal projection, since obviously another direction might with other corresponding changes render them equally accessible; but their exposure at the side of the action at which the final ducts lead to the perforated controlling-sheet 10 is the essential characteristic of this feature of my invention.

Having thus described my invention, what I claim as new, and desire to secure by Letters Patent, is—

1. In a pneumatically-operated musical instrument, the combination with an exhaust-chamber and diaphragms in the bottom of said chamber which control the operation of the primary valve mechanism, of air-supply ducts whose lower mouths are beneath said diaphragms and whose upper extremities are beneath the paper containing the sound-producing characters, exhaust-ducts communicating between said exhaust-chamber and said air-supply ducts, and screws extending across the air-supply ducts, designed to close said exhaust-ducts for regulating the effective caliber thereof, and whereby the supply of air beneath said diaphragms may be controlled, substantially as described.

2. In a pneumatically-operated musical instrument, the combination with an exhaust-chamber and diaphragms in the bottom of said chamber which control the operation of the primary valve mechanism, of air-supply ducts whose lower mouths are beneath said diaphragms, and whose upper extremities are beneath the paper containing the sound-producing characters, exhaust-ducts between said exhaust-chamber and said air-supply ducts, and screws passed through the walls of said air-supply ducts and across the same so as to register with the mouths of said exhaust-ducts, whereby a portion of each of said air-supply ducts is designed to serve as an exhaust-duct at predetermined times, substantially as described.

3. In a pneumatically-operated musical instrument, the combination with an exhaust-chamber and diaphragms in the bottom of said chamber which control the operation of the primary valve mechanism, of air-supply ducts whose lower mouths are beneath said diaphragms, and whose upper extremities are beneath the paper containing the sound-producing characters, exhaust-ducts communicating with said exhaust-chamber and air-supply ducts, and means traversing said air-supply ducts for controlling the effective caliber of said exhaust-ducts, whereby the portions of said air-supply ducts beneath said controlling means are designed at times to serve as an exhaust-duct, and also whereby the atmospheric pressure upon said diaphragms may be regulated, substantially as described.

4. In a pneumatically-operated musical instrument, the combination with an exhaust-chamber, and diaphragms in the bottom of said chamber which control the operation of the primary valve mechanism, of air-supply ducts whose mouths at one end are beneath said diaphragms, and whose mouths at the opposite end are in position to be closed by the paper containing the sound-producing characters; exhaust-ducts communicating between said exhaust-chamber and said air-supply ducts, having each a portion leading from the exhaust-chamber, which, continued in the same direction, penetrates the board containing the same at a surface of said board at the side of the pneumatic action at which said air-supply ducts lead to said paper, and screws set in through such surface in said direction, seating endwise in said portions of the ducts respectively.

In testimony whereof I have hereunto set my hand, in the presence of two witnesses, at Chicago, Illinois, this 6th day of January, 1904.

HERBERT E. SHARPS.

In presence of—
CHAS. S. BURTON,
FREDK. G. FISCHER.